Feb. 11, 1947.  E. M. MOREHOUSE  2,415,517
SELF-LOCKING CLIP
Filed July 24, 1944  2 Sheets-Sheet 1
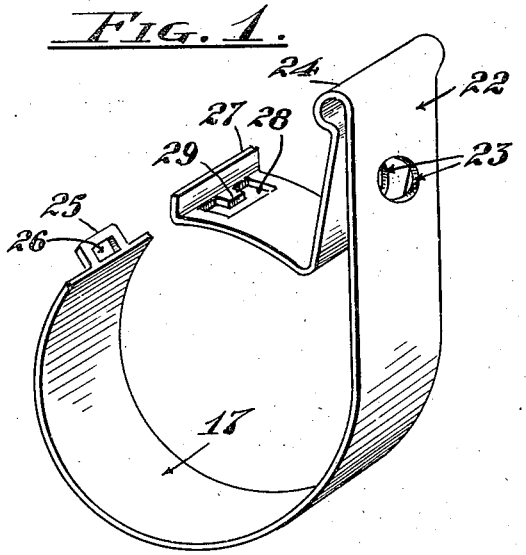
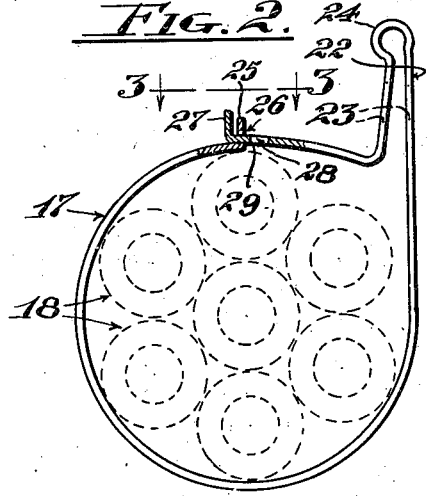
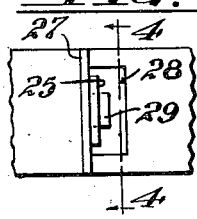
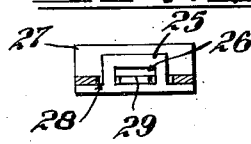
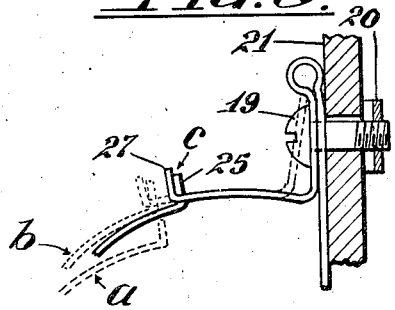
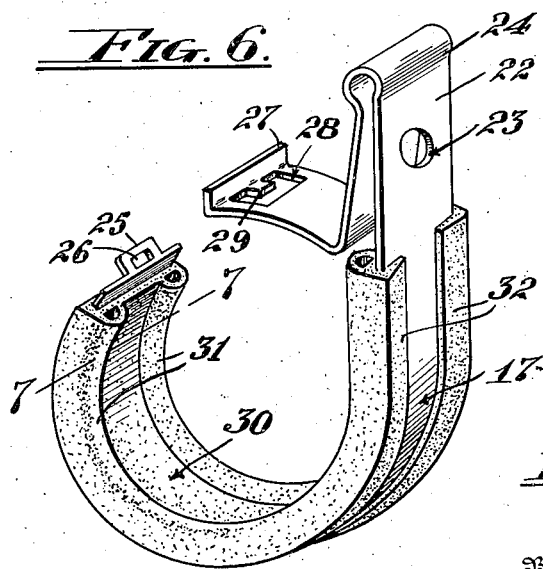
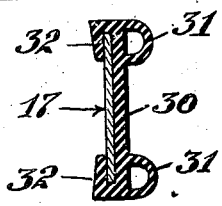
Inventor
Eugene M. Morehouse;
By R. S. Berry
Attorney Feb. 11, 1947. E. M. MOREHOUSE 2,415,517
SELF-LOCKING CLIP
Filed July 24, 1944. 2 Sheets-Sheet 2
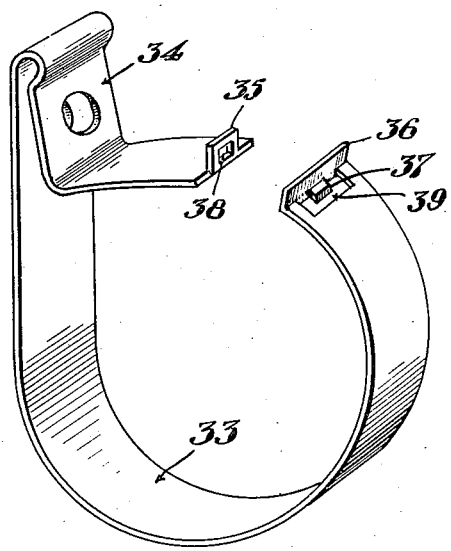
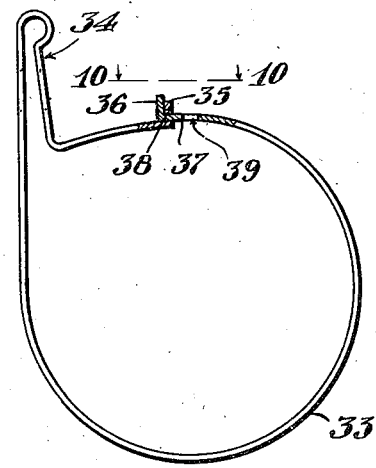
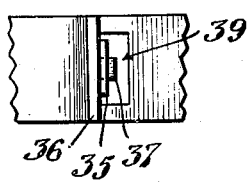
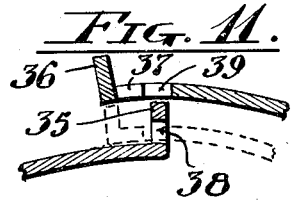
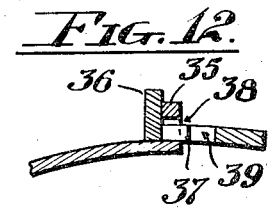
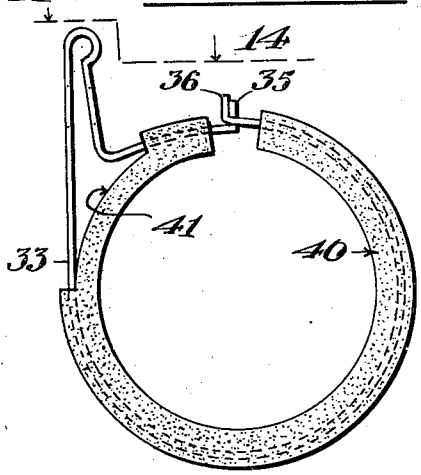
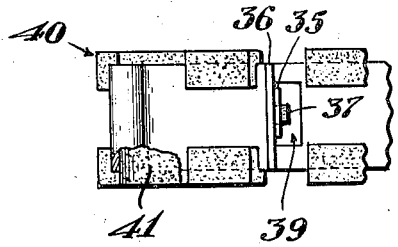
Inventor
Eugene M. Morehouse
By R. S. Berry
Attorney Patented Feb. 11, 1947

2,415,517

UNITED STATES PATENT OFFICE 2,415,517

SELF-LOCKING CLIP

Eugene M. Morehouse, Tujunga, Calif., assignor to Adel Precision Products Corp., a corporation of California Application July 24, 1944, Serial No. 546,332

6 Claims. (Cl. 248—74)

This invention relates to wire or conduit supporting clips for supporting groups of electrical wires or a conduit line throughout aircraft and like structures where it is the practice to fasten the conductor and conduit lines at closely spaced intervals to structural or frame parts past and adjacent which such lines are extended.

An object of this invention is to provide a clip of the character described in which a resilient metal strap bent into the form of a normally open loop having end portions adapted to be hooked together to clamp the loop around the wires or conduit, is formed with a simple and effective locking means operating when the ends are interengaged or hooked one to the other, to lock the end against accidental unhooking.

Another object is to provide a clip such as described in which the interlocking end portions are subject to being readily and easily interlocked and released as desired before or after installation of the clip upon a support such as a structural part of an aircraft or the like, whereby wires or conduit may be mounted in the clip before installation on the support, or applied or removed after the clip is mounted on the support.

A further object is to provide a clip such as described wherein a novel attaching ear formation which operates to tighten and secure the interlocking ends of the clip also constricts and clamps the clip around the wires or conduit upon the fastening of the clip to a support.

Yet another object is to provide a clip such as described in which the locking means for the interengaging ends of the clip constitutes a small tongue or lip on one of said ends adapted to extend through an opening in the other of said ends, when said ends are hooked together, thereby providing in effect a dual hooking or interengaging of the ends in a manner preventing accidental disengagement thereof, but permitting of a ready intentional unhooking operation to open the clip.

Another object of my invention is to provide a clip such as described in which the interengaging or hook ends thereof have large flat seating surfaces arranged to have close contact with one another and so as to more effectively distribute the strains imposed on the ends and prevent localization of the strains at the bends, edges and weaker points of the clip.

With the foregoing objects in view, together with such other objects and advantages as may subsequently appear, the invention resides in the parts and in the combination, construction and arrangement of parts hereinafter described and claimed, and illustrated by way of example in the accompanying drawings, in which Fig. 1 is a perspective view of the clip as shown from the rear thereof;

Fig. 2 is a view of the clip as seen in side elevation, partly in section, illustrating it as applied in a preassembly of electrical conductors;

Fig. 3 is a detail in plan as seen on the line 3—3 of Fig. 2 showing the manner of interengaging the ends of the clip;

Fig. 4 is a view in section and elevation as seen on the line 4—4 of Fig. 3;

Fig. 5 is a fragmentary view in side elevation of the upper portion of the clip illustrating at a, b and c the progressive positions taken by the interengaging ends in applying the clip and finally attaching it to a support;

Fig. 6 is perspective view of the clip shown in Fig. 1 showing it as equipped with a cushion element;

Fig. 7 is a view in cross section taken on the line 7—7 of Fig. 6;

Fig. 8 is a perspective view of the clip as seen from the front thereof showing it as fitted with an alternative arrangement of the elements for connecting the ends of the clip;

Fig. 9 is a view of the clip shown in Fig. 8 as seen in side elevation, partly in section, showing the ends thereof connected;

Fig. 10 is a detail plan view as seen on the line 10—10 of Fig. 9;

Fig. 11 is a detail in longitudinal section illustrating the manner in which the ends of the clip are initially interengaged;

Fig. 12 is a sectional view showing the ends of the clip as finally interconnected;

Fig. 13 is a view in side elevation of the clip shown in Fig. 8 showing it as fitted with a cushion;

Fig. 14 is a detail in plan as seen on the line 14—14 of Fig. 13.

As shown in the accompanying drawings a clip made in accordance with my invention generally includes a normally open loop 17 formed of a spring metal strap and having end portions constructed so that they may be detachably hooked together to close the loop around a group of wires 18 or a conduit not shown, before or after the clip is secured, as shown in Fig. 5, by means of a bolt 19 and nut 20 to a support 21.

The strap is doubled upon itself and extended outwardly from the loop at a point spaced inwardly from one end portion of the loop, to provide an inverted V-shaped attaching ear 22 having registering openings 23 in opposed legs thereof for reception of the bolt 19. The opposed legs of the ear 22 are drawn together as shown in Fig. 5 when the clip is securely fastened to the support and this collapsing of the ear causes the loop to be constricted and tightly clamped around the wires or conduit, as well as effects a tensioned contact of the interengaged ends to securely hold them together.

An arcuate and nearly circular, or at least more than semi-circular, bend 24 is made at the outer end of the ear 22 to prevent breaking or weakening of the ear with repeated fastening and removal thereof relative to the support.

The present invention deals primarily with the construction of the interengaging ends of the loop but also includes the combination thereof with the other clip elements to the extent of the cooperation and interdependence thereof with the interengaging ends.

In accordance with my invention one end of the loop is reduced and bent to project substantially right angularly outward from the loop as flat hook member 25 provided with an opening 26 therein.

The other end of the loop is similarly bent to project outwardly as a flat projection or hook member 27 and is equal in width to that of the strap. Rearwardly of the projecting hook member 27 the strap is provided with a slot 28 arranged to receive the hook member 25 in such manner that the two ends will be hooked together with the opposed flat faces of the members 25 and 27 opposed to one another and subject to being brought into close contact as shown in Fig. 5.

Means is embodied in the interengaging ends for locking them together against such relative movement inwardly or outwardly as would unhook them when the seating faces of the members 25 and 27 abut one another as well as when said faces are somewhat spaced but are in close proximity to one another, for example, in the position shown in Fig. 2. This means is provided by the simple expediency of forming a small locking tongue or lug 29 extending into the relatively wide slot 28 from the base of the member 27 and lying substantially in the plane of the adjacent part of the loop proper whereby the tongue may be extended through the opening 26 in the member 25, when the latter has been hooked into the slot 28 and brought into opposition to the member 27. When the locking tongue is positioned in this manner the ends are locked against relative movement outwardly and inwardly such as would permit the movement of the hook member 25 out of the slot 28. However when it is desired to unhook or disengage the ends of the loop for inserting or removing the wires, which can be done before or after the clip is fastened to the support, the operator moves the member 25 circumferentially of the loop away from the member 27 as permitted by the width of the slot 28, until the tongue 29 is withdrawn from opening 26 in member 25, whereupon the member 25 may be moved inwardly or member 27 outwardly, to clear the slot 28, and the ends of the loop will then spring apart due to the spring action of the body of loop.

It is now apparent that the locking tongue 29 in coaction with the members 25 and 27 and the opening 26 and slot 28 in said members provides for a reliable yet quickly releasable locking of the ends together to close the loop around the wires, and to prevent accidental opening of the loop under the vibratory stresses imposed thereon in aircraft and the other automotive equipment where the clips hereof are used. The fact that the opening 26 and slot 28 are both apertures of the closed or continuous margin type contributes to the efficiency of the locking function.

It is important to note that the opposed faces of the members 25 and 27 closely abut when the clip is completely installed so as to take the full strain imposed on said ends and prevent breaking or weakening of the clip at the bends which are made to form members 25, 27 and 29.

The body of the loop is tensioned so that when the hook member 25 is disposed in the slot 28 and released by the operator it will spring into position as indicated in Figs. 3 and 5, causing the locking tongue to pass through the opening 26, and thereby lock the ends together.

Referring to Figs. 6 and 7 it is seen that a cushion 30 may be used in connection with the clip shown in Figs. 1 to 5 to prevent the wires from chafing and also absorb vibrations. This cushion has longitudinal hollow ribs 31 to increase the cushioning action, and is provided with rebent marginal flanges 32 for holding the cushion on the loop.

Referring to Figs. 8 to 14 inclusive it is seen that the loop 33 and ear 34 of a modified form of my clip are of the same construction and arrangement as in the clip shown in Figs. 1 to 7, and that the hook members 35 and 36 and the locking tongue 37 correspond to the members 25, 27 and 29 respectively in the first described form, but are located on reverse ends. In Figs. 1 to 7 the tongue 29 and member 27 and slot 28 are on the end next adjacent the ear 22, whereas in Figs. 8 to 14, the hook 35 with its opening 38 corresponding to hook 25 and opening 26 are on the end of the loop next adjacent the ear 34, while the member 36 and locking tongue 37 corresponding to members 27 and 29 also the slot 39 corresponding to slot 28, are provided on the other end of the loop. Figs. 10, 11, and 12 clearly show that this modified clip is operated to hook and unhook its ends in the same manner as the clip shown in Figs. 1 to 7. However in having the end farthest removed from the attached or ear-carrying end, provided with the locking tongue 37, this tongue may be more readily and easily intentionally moved into and out of locking position, yet the locking action thereof will be as reliable as in the form of my invention shown in Figs. 1 to 7.

Figs. 13 and 14 show the application of a cushion 40 to the modified form of clip shown in Figs. 8 to 12, and this cushion is made so as to substantially encircle the wires or conduit to prevent contact thereof with the metal of the clip. This is provided for by using a longer cushion than shown in Fig. 6 and cutting away the rebent flanges as at 41 adjacent inner ends of the legs of the attaching ear 34 so that said ear may be collapsed and allowed to spring back to inverted V shape without interference.

It is now seen that the clips here shown as embodying my invention may be quickly and easily clamped around the wires before being installed on a support as will be apparent with the reference to Fig. 6, or the wires may be inserted or removed after the clip is fastened to the support as is apparent with reference to Fig. 5. In any case when the ends of the clip are hooked together the locking tongue will effectively prevent accidental opening of the clip but may be readily manipulated to permit opening of the clip when it is desired to insert or remove wires or the conduit.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clip for supporting wires or a conduit, a normally open loop formed of a spring metal strap and having end portions adapted to be brought together to clamp the loop around the wires or a conduit, outward projections on the end portions of said loop, one of said end portions having a slot therein contiguous the projection thereon for reception of the other projection to hook the end portions together, said other projection having an opening therein, and a locking tongue on said one end portion adapted to extend into said opening to prevent an unhooking movement of said end portions.

2. In a clip for supporting wires or a conduit, a normally open loop formed of a spring metal strap having its end portions adapted to be brought together to clamp the loop around the wires or a conduit, an outward projection on one of said end portions having an opening therein, the other end portion having a slot therein extending transversely thereof through which said projection may be inserted to hook the end portions together, and a locking tongue on said other end portion extending into said slot so that it may be inserted through the opening in said projection when the latter is inserted through said slot, whereby said end portions are locked against such inward and outward movement relative to the loop as would permit of unhooking thereof, said slot having a width such that the end portions may be relatively moved circumferentially of the loop to withdraw the tongue from said opening whereby the said projection may be withdrawn from said slot to unhook said end portions.

3. In a clip for supporting wires or a conduit, a normally open loop formed of a spring metal strap having its end portions adapted to be brought together to clamp the loop around the wires or a conduit, an outward projection on one of said end portions having an opening therein, the other end portion having a closed slot therein extending transversely thereof through which said projection may be inserted to hook the end portions together; and a locking tongue on said other end portion extending into said slot so that it may be inserted through said opening in said projection when the latter is extended through said slot, whereby said end portions are locked against such inward and outward movement relative to the loop as would permit unhooking thereof, said slot having a width such that the end portions may be relatively moved circumferentially of the loop to withdraw the tongue from said opening whereby the said projection may be withdrawn from said slot to unhook said end portions, said loop being tensioned so that upon hooking said end portions together, the outward projection will spring into position to receive the locking tongue in the opening therein.

4. In a clip for supporting wires or a conduit, a normally open loop formed of a spring metal strap having its end portions adapted to be brought together to clamp the loop around the wires or a conduit, hook elements on said end portions adapted to be interengaged to hook said ends together, the hook element on one end portion having an opening therein, and a tongue on the other end portion adapted to extend through said opening and engageable with a side portion thereof to prevent relative inward and outward movement of said ends such as would unhook said elements.

5. In a clip for supporting wires or a conduit, a normally open loop formed of a spring metal strap having its end portions adapted to be brought together to clamp the loop around the wires or a conduit, an outward projection on one of said end portions having an opening therein, the other end portion having a slot therein extending transversely thereof through which said outward projection may be inserted to hook the end portions together and a locking tongue on said other end portion extending into said slot so that it may be inserted through said opening in said projection when the latter is inserted into said slot, whereby said end portions are locked against such inward and outward movement relative to the loop as would permit unhooking thereof, said slot having a width such that the end portions may be relatively moved circumferentially of the loop to withdraw the tongue from said projection whereby the projection may be withdrawn from said slot to unhook said end portions, and an inverted V-shaped attaching ear having its legs formed integral with the loop and adapted to be drawn together when a fastening is tightened in the apertures therein for securing the ear to a support, whereby the loop will be constricted and the locking tongue will be held in said opening in said outward projection.

6. In a clip for supporting wires or a conduit, a normally open loop formed of a spring metal strap having its end portions adapted to be brought together to clamp the loop around the wires or a conduit, an outward projection on one of said end portions having an opening therein, said other end portion having a slot therein extending transversely thereof through which said projection may be inserted to hook the end portions together, and a locking tongue on said other end portion extending into said slot so that it may be inserted through said opening in said projection when the latter is extended through said slot, whereby said end portions are locked against such inward and outward movement relative to the loop as would permit unhooking thereof, said slot having a width such that the end portions may be moved relatively circumferentially of the loop to withdraw the tongue from said opening whereby the said projection may be withdrawn from said slot to unhook said end portions, and an inverted V-shaped attaching ear having its legs formed integral with the loop and adapted to be drawn together when a fastening is tightened in the apertures therein for securing the ear to a support, whereby the loop will be constricted and the locking tongue will be held in said opening in said outward projection, and a cushion strip mounted on said loop and bridging the gap in said loop where the legs of said ear are joined thereto, one end portion of said cushion being attached to said loop at both sides of said gap.

EUGENE M. MOREHOUSE.

REFERENCES CITED

The following references are of record in the file of this patent:

UNITED STATES PATENTS

| Number | Name | Date |
|---|---|---|
| 2,340,713 | Tinnerman | Feb. 1, 1944 |
| 2,352,856 | Morehouse | July 4, 1944 |
| 888,349 | Ogden | May 19, 1908 |